Figure 1:
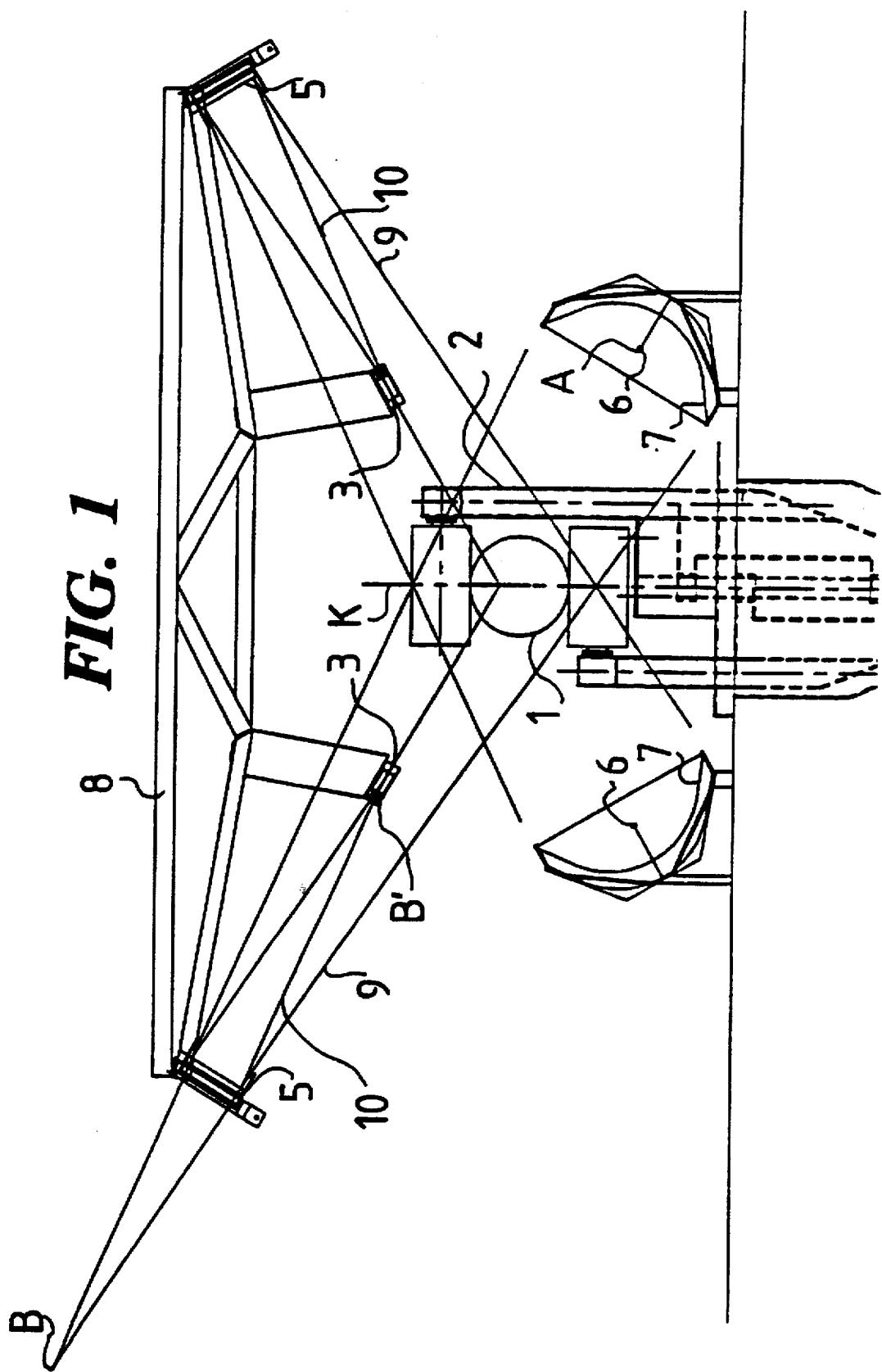

United States Patent [19]

Koskenohi

[11] Patent Number: 5,666,204
[45] Date of Patent: Sep. 9, 1997

[54] METHOD AND APPARATUS FOR OPTICAL SHAPE MEASUREMENT OF OBLONG OBJECTS

[75] Inventor: Kimmo Koskenohi, Helsinki, Finland

[73] Assignee: Cimmon OY, Helsinki, Finland

[21] Appl. No.: 640,893

[22] PCT Filed: Nov. 10, 1994

[86] PCT No.: PCT/FI94/00508

§ 371 Date: May 8, 1996

§ 102(e) Date: May 8, 1996

[87] PCT Pub. No.: WO95/14211

PCT Pub. Date: May 26, 1995

[30] Foreign Application Priority Data

Nov. 17, 1993 [FI] Finland .................................. 935090

[51] Int. Cl.⁶ ........................................... G01B 11/02
[52] U.S. Cl. ..................... 356/376; 356/383; 356/384
[58] Field of Search ........................ 356/376, 383, 356/384, 385, 387, 381; 250/559.24, 559.25, 559.27; 348/131, 88

[56] References Cited

U.S. PATENT DOCUMENTS 4,179,707  12/1979  Sjodin ........................ 250/559.26
4,770,537   9/1988  Koskenohi ............................ 356/384

*Primary Examiner*—F. L. Evans
*Attorney, Agent, or Firm*—Smith-Hill and Bedell

[57] ABSTRACT

According to the present method of optical measurement of shape of oblong objects, a reflector with a light source in front of it is placed to the opposite side of the object relative to the camera. The reflector is provided with a cross section shaped so that the rays emitted by the light source and reflected from a mirror converge at a focal point. The camera is placed to this point or an optically equivalent point, whereby the rays emitted by the light source and reflected from the mirror are aimed to enter the lens of the camera. According to the most advantageous embodiment of the invention, to the opposite side of the object relative to the camera is placed an elliptical reflector having the light source placed at its first focal point. The camera is placed to the other focal point of the ellipse or an optically equivalent point, whereby the rays emitted by the light source and reflected from the elliptical reflector via the mirror are aimed to enter the lens of the camera.

14 Claims, 2 Drawing Sheets

METHOD AND APPARATUS FOR OPTICAL SHAPE MEASUREMENT OF OBLONG OBJECTS

The invention relates to a method for optical shape measurement of oblong objects.

The invention also concerns an apparatus for implementing the method.

When the shape of oblong objects such a boards is measured optically, a problem is caused by the geometrical constraint that the shape of the objects to be measured usually differs substantially from the scan aspect ratio (e.g., square) of the measurement apparatus. If the entire object being measured can be accommodated in the scan area, the relative measurement accuracy for its width dimension will be inferior to the relative measurement accuracy for its length dimension by an order of magnitude.

Attempts have been made to overcome this problem by adapting a multiplicity of cameras in a row along the longitudinal direction of the object being measured. Such an embodiment is, however, handicapped by the great number of equipment required and the difficulty of joining the pictures together.

Another prior-art technique is to record the object moving past the scan area of the imaging system as a series of sequential pictures. This arrangement in turn is hampered by the difficulty of arranging a sufficiently long, undisturbed travel for the object being measured.

FI Pat. No. 68,910 discloses equipment capable of overcoming several problems in optical measurement methods and providing an essentially improved apparatus for optical shape measurement of oblong objects.

The equipment described in cited FI Pat. No. 68,910 is based on distorting the picture by means of a mirror or lens having a different radius of curvature in the different main directions so that the measurement camera "sees" the width and length dimensions of the object being measured as having an order of equal magnitude, while the image field of depth is retained by using an elongated slit aperture in the camera optics. With the help of the curved mirror, even the image of a substantially long object can be distorted so as to fit in the scan area of the measurement camera as the camera sees the object image reflected from the curved mirror shorter than in nature. Moreover, such distorted imaging with object length contraction makes the relative measurement accuracy equal in both the width and length dimensions of the object (e.g., yielding a relative measurement error of 1% of object width and 1% of object length even if the object length would be 10-fold as compared with the object width).

The equipment described in cited FI Pat. No. 68,910 comprises a horizontal measurement platform on which sawn lumber to be measured is fed one by one. Above the measurement platform is adapted a mirror aligned to reflect the image of the object lying on the measurement platform to the lens of the camera. The camera is connected to image processing equipment for processing the image information rendered by the camera into control information suited for, e.g., optimizing the lumber sawing process. The lengthwise contracted image of the object is available to the operator on a monitor screen.

The reflective surface of the mirror has a different radius of curvature along its longitudinal and lateral axes so that the object image reflected to the camera lens is lengthwise contracted relative to its width dimension. This is attained by making the mirror unidirectionally curved so that the contour of the reflective surface is curved along the mirror axis parallel to the longitudinal axis of the object being measured, while the mirror surface along the mirror axis parallel to the transverse axis of the object is straight. This arrangement serves for contracting the apparent length of the object being measured to the same order of magnitude on the image plane of the camera.

To keep the image field of depth equal in the directions of both principal axes, the camera optics is provided with a narrow slit aperture which in the described embodiment is aligned horizontal and transverse to the longitudinal axis of the object being measured. The effect of such an aperture is that the light rays imaging longitudinally the object being measured can reach the camera optics only through the slit bounded by the narrow width of the aperture. By contrast, the light rays imaging laterally the object being measured can reach the camera optics over the entire length of the slit aperture.

In the edging of lumber, for instance, the board arrives to the measurement platform in a transverse position, and after alignment, is next conveyed to the actual edging saw. With the help of the curved mirror, the scan area of the measurement camera is adapted to encompass the entire piece of lumber. The imaged area may be, e.g., 600 mm by 6000 mm, whereby the camera image with an aspect ratio of 4:3 is available on the monitor screen. The same camera image information is digitized and transferred to a control computer which performs image analysis on the object shape detected from the image, optimizes the sawing position and controls the lumber conveyor with required alignment data.

The principle of maintaining image focus depth constant is based on limiting the oblique rays reflected from the curved mirror away with the help of the slit aperture. Then, all rays travelling in the cross-sectional plane are incident on a straight mirror surface and are thus sharply focused according to known laws of optics unblurred on the image plane, that is, all rays travelling from the same object point via different paths coincide at the same point on the image plane. By contrast, rays travelling due to the curvature of the mirror via different paths in the longitudinal plane of the object will not meet at a single point of the image plane, but rather, object points will be imaged as streaks. By limiting all other rays with the help of the slit aperture except the straight-path travelling principal ray from reaching the image plane, each object point in the longitudinal plane will be imaged as a point on the image plane, thus avoiding the blurring effect of the curved mirror.

The above-described embodiment is hampered by the fact that the use of the curved mirror necessitates an elongated, slit-shaped iris, whereby the numerical aperture of the camera obviously must be large. The use of a large numerical aperture degrades the field of depth and thus the accuracy of the optical measurement. The measurement process is further complicated by the varying conditions of object illumination and darkness variations of the object. Pattern recognition based on the video camera picture could be essentially eased and speeded if the object would form a clear contrast with the background and the picture would contain as few surfaces unrelated to the object being identified as possible. With small objects this problem can generally be solved, while the elimination of the effect of varying illumination conditions on the measurement of large, moving objects is much more complicated. In a typical situation of lumber measurement, the dimensions of the measurement area are in the order of 1 m by 8 m, and the measurement is performed on objects moving on a conveyor to which the operator must have an unobstructed view and access for clearing disturbance situations. Resultingly, the illumination conditions cannot be made constant by, e.g., housing the equipment in an enclosure.

If the measurement of the object silhouette is sufficient for the determination of the object shape, the problem can be overcome by making the background lighting so bright as to make the object always darker than the background even if direct sunlight would hit the object.

The present invention is based on placing a reflector with an illuminating light source in front of the reflector to the opposite side of the object relative to the camera. The reflector is so shaped as to direct the rays to reflect from the mirror to a common focus. The camera is placed to this focal point or optically equivalent point, whereby the rays emitted from the light source and mirrored from the reflector are directed into the aperture of the camera lens.

According to the most advantageous embodiment of the invention, to the opposite side of object relative to the camera is placed an elliptical reflector whose focal point is provided with a light source. The camera is placed to the other focal point of the elliptical reflector or an optically equivalent point, whereby the rays emitted from the light source and reflected from the elliptical reflector via the mirror hit the aperture of the camera lens.

The invention offers significant benefits.

The greatest benefit of the invention is that the improved contrast makes pattern recognition from the video camera picture easier and faster owing to the improved contrast ratio, whereby a more reliable recognition result is obtained at a reduced disturbance level. As the camera is placed at the focal point of the elliptical reflector, the camera can be operated with a smaller numerical aperture and no elongated slit aperture is required. This arrangement overcomes the blurring problem incurred by the curved mirror. Hence, the present invention is capable of substantially improving the measurement method disclosed in cited FI Pat. No. 68,910.

In the following, the invention will be examined in more detail with reference to the attached drawings, in which:

FIG. 1 presents an embodiment of the invention; and

Figure 2:
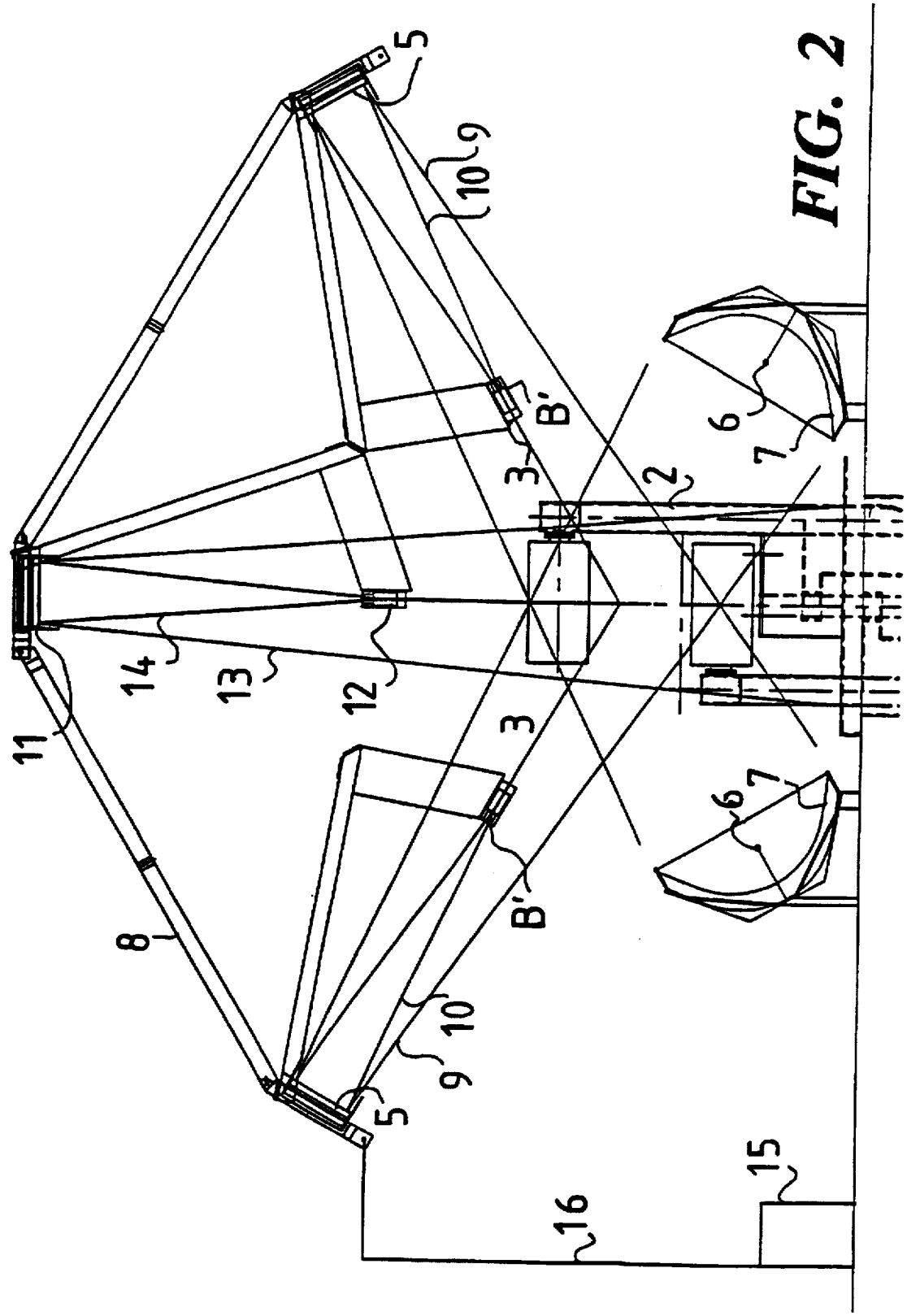

FIG. 2 presents another embodiment of the invention.

In the context of the present invention, the term optically equivalent point denotes a point which is displaced by means of, e.g., a mirror from its initial point. Such a displaced point can be, e.g., the virtual focal point of rays travelling from the reflector to the mirror and then reflected therefrom, whereby the one of the focal points of the elliptic reflector actually is situated behind the mirror.

By virtue of the present invention, the amount of light entering the camera can be increased so much as to permit closing the iris of the camera by so many stops that the slit aperture will be unnecessary, whereby a conventional circular iris can be used.

With reference to FIG. 1, an embodiment of the invention is shown comprising two cameras 3 and two sources 6, 7 of light. Obviously, the two cameras serve for obtaining two-dimensional information on the shape of the object. Placed at the center axis K of the apparatus, this equipment includes a measurement carrier 2 with transfer and alignment facilities on which the objects 1 to be measured are transferred to the measurement site and further therefrom to the next working step simultaneously being aligned to an optimal feed position prior to working on the basis of the measurement data. Above the measurement carrier 2 is adapted a lattice frame 8 supporting two cameras 3 and curved mirrors 5 according to cited FI Pat. No. 68,910. The mirrors 5 are placed to the sides of the measurement carrier 8 and slightly above the carrier so that the mirrors 5 are aligned toward the object 1 to be measured so as to reflect the image of the object back toward the object 1. The distance of the mirrors 5 from the object 1 to be measured typically is 3 m.

Further to the sides of the measurement carrier 2 and slightly below the carrier are adapted luminaires 6, 7 for the illumination of the object 1 to be measured. Each luminaire comprises a reflector 7 and a light source 6. The typical dimensions of the luminaire are 1 m by 8 m. The luminaires 6, 7 serve for accomplishing a sufficient contrast ratio between the object 1 to be measured and the background by providing rear illumination of the object. To attain optimal illumination conditions, the cross section of the luminaire 7 is shaped as a half-ellipse and the fluorescent tube 6 used as the light source is placed at the focal point of the ellipse. Thus the reflector behaves so that each ray leaving the light source is reflected from the reflector to the other focal point B of the ellipse. Since the curved mirrors 5 are on the path of the light beam 9 leaving the luminaire 6, 7, the mirror reflects the entire image of the object 1 being measured and the light leaving the luminaire 6, 7 as a light beam 10 to a virtual focal point B' formed in front of the mirror. As the cameras 3 are placed to said point B', the camera 3 sees the entire background of the measurement scene illuminated over the entire length of the reflector with practically the same luminous intensity as the photometric brightness of the light source 6. Accordingly, the theoretically correct shape of the luminaire 6, 7 is achieved by making the reflector 7 elliptical and placing the light source to the closer focal point A, while the camera 3 is situated at the other focal point B aligned toward the luminaire 6, 7. Because the measurement method is based on the use of the curved mirror 5, the latter focal point is displaced by the reflection from the mirror to in front of the mirror 5, and thus, the position of the focal point B is moved to a virtual focal point B'.

Due to the high luminous intensity, such use of background lighting permits stopping down the camera iris to such a small diameter that the prior-art blurring problem associated with the use of the curved mirror is solved without any additional measures.

With reference to FIG. 2, another embodiment of the invention is shown. This embodiment is otherwise similar to the embodiment described above with the exception that above the transfer platform 2 is adapted a third mirror 11 and a third camera 12. The image of the object being measured is aimed toward the camera 12 as a light beam 13 and the mirror 11 reflects the image to the lens of the camera 12. In this embodiment the third camera 12 functions in the same fashion as the apparatus described in cited FI Pat. No. 68,910. The optics of the camera 12 is provided with a slit, whereby a sufficient level of background illumination is obtained from the crossing light beams of the luminaires 6, 7. This embodiment is applicable to special occasions such as use of the equipment for determining the shape of logs when also the ovality of the log is required to be known. The illumination level provided by the two luminaires at the sides of the object is sufficient for the third camera.

The processing of the measurement data can be performed using suitable equipment such as a microcomputer 15 which is connected by cabling 16 to the cameras 3, 12 and runs an image analysis program.

Aside the applications described above, the present invention may have alternative embodiments. Accordingly, the placement of the mirrors and cameras can be freely varied according to the constraints set by the object to be measured. For instance, one camera could be placed above the object and another camera to its side, or alternatively, in the simplest cases only one camera could be used. Obviously, the dimensions of the equipment must be made compatible with the intended application. The mirrors and reflectors may also be replaced by lenses performing the required optical function. Such an embodiment plausibly is suited for objects of relatively small dimensions only as the manufacture of large lenses is difficult and costly. The elliptic reflector can be replaced by any other cross section of the reflector that provides such an aimed light beam which can be reflected from the curved mirror to a focal point of sufficiently small size.

I claim:

1. A method of optically measuring the shape of an elongated object, comprising:

placing the object on a measurement carrier defining a longitudinal axis, illuminating the object with a luminaire including a light source, reflecting an image-bearing beam from the object by means of a curved mirror spaced from the object, the mirror being curved in a manner such that the image of the object is contracted along said longitudinal axis relative to a lateral direction, and receiving the reflected image-bearing beam with a camera having a lens, whereby image information is acquired by the camera, wherein the light source is imaged at the lens of the camera.

2. A method according to claim 1, further comprising processing the image information acquired by the camera to provide control information.

3. A method according to claim 1, comprising:

illuminating the object with two luminaires including respective light sources, reflecting two image-bearing beams from the object by means of respective curved mirrors spaced from the object, each mirror being curved in a manner such that the image of the object is contracted along said longitudinal axis relative to a lateral direction, and receiving the reflected image-bearing beams with respective cameras each having a lens, whereby image information is acquired by each camera, wherein the two light sources are imaged at the lenses of the cameras respectively.

4. A method according to claim 3, comprising reflecting a third image-bearing light beam from the object by means of a third curved mirror, and receiving the third image-bearing light beam with a third camera, wherein the three light beams are in crossing relationship.

5. A method according to claim 1, comprising illuminating the object with a luminaire that comprises a light source and an elliptical reflector and wherein the lens of the camera is optically conjugate with the light source.

6. A method according to claim 5, wherein the reflector is configured as a part of an elliptical surface in section perpendicular to said longitudinal axis, and the light source is at one focus of the elliptical surface and the lens of the camera is at the other focus of the elliptical surface or at an optically equivalent position.

7. A method of optically measuring the shape of an elongated object disposed substantially on a longitudinal axis, comprising:

illuminating the object with a luminaire including a light source and a concave reflector, reflecting an image-bearing beam from the object by means of a curved mirror spaced from the object, the mirror being curved in a manner such that the image of the object in the reflected beam is contracted along said longitudinal axis relative to a lateral direction, and receiving the reflected image-bearing beam with a camera having a lens, whereby image information is acquired by the camera, wherein the light source is imaged at the lens of the camera.

8. A method according to claim 7, further comprising processing the image information to provide control information for use in connection with the object.

9. Apparatus for optically measuring the shape of an elongated object, comprising:

a measurement carrier for supporting the object in substantial alignment with a longitudinal axis, a luminaire including a light source positioned and oriented for illuminating the object supported by the measurement carrier, a curved mirror spaced from the measurement carrier for reflecting an image-bearing beam from the object, and an imaging device for receiving the reflected image-bearing beam and imaging the object, whereby image information is acquired, the imaging device having an entrance aperture, wherein the mirror is curved in a manner such that the image of the object is contracted along said longitudinal axis relative to a lateral direction and the light source is imaged at the entrance aperture of the imaging device.

10. Apparatus according to claim 9, wherein the luminaire is at least co-extensive lengthwise with the object and comprises a light source and a concave reflector which directs light from the light source toward the mirror.

11. Apparatus according to claim 9, wherein the reflector is elliptic in section perpendicular to the longitudinal axis and the light source is at one focus of the elliptic reflector and the entrance aperture of the imaging device is at the other focus of the elliptic reflector or at an optically equivalent position.

12. Apparatus according to claim 9, further comprising image processing equipment connected to the imaging device for processing image information and providing control information.

13. Apparatus according to claim 9, comprising a second luminaire positioned and oriented for illuminating the object supported by the measurement carrier, a second curved mirror for reflecting a second image-bearing beam from the object, and a second imaging device for receiving the second image-bearing beam, and wherein the imaging devices are symmetrically located relative to a plane containing the longitudinal axis, the luminaires are symmetrically located relative to said plane and the mirrors are symmetrically located relative to said plane.

14. Apparatus according to claim 13, further comprising a third imaging device and a third curved mirror, wherein the two luminaires are below the measurement carrier and the third imaging device and the third curved mirror are above the measurement carrier.

* * * * *